United States Patent
Heintzeman

[19]

[11] Patent Number: 5,885,037
[45] Date of Patent: Mar. 23, 1999

[54] PIVOTING DRILL PRESS MOUNT

[76] Inventor: Michael G. Heintzeman, 8200 Semmler Rd., Nisswa, Minn. 56468

[21] Appl. No.: 49,520

[22] Filed: Mar. 27, 1998

Related U.S. Application Data

[60] Provisional application No. 60/042,529, Apr. 1, 1997.

[51] Int. Cl.[6] .................................................. B23B 35/00
[52] U.S. Cl. ........................... 408/1 R; 408/88; 408/110; 408/236
[58] Field of Search .............................. 408/1 R, 88, 110, 408/111, 236

[56] References Cited

U.S. PATENT DOCUMENTS

| | | |
|---|---|---|
| 3,102,440 | 9/1963 | Miller . |
| 3,387,638 | 6/1968 | West .......................................... 408/88 |
| 3,992,831 | 11/1976 | Bukovitz et al. .......................... 52/116 |
| 4,118,141 | 10/1978 | Spohn, Jr. ................................. 408/236 |
| 4,569,627 | 2/1986 | Simunovic ................................ 408/236 |
| 5,150,993 | 9/1992 | Miller ....................................... 408/110 |
| 5,662,441 | 9/1997 | Wang ....................................... 408/111 |

OTHER PUBLICATIONS 2 pages from catalog for American Machine Tool Company showing radial drill presses.

1 page from catalong for Delta International Machinery Corp showing radial drill press.

*Primary Examiner*—Daniel W. Howell
*Attorney, Agent, or Firm*—Patent Law Offices of Rick Martin, P.C.; Margaret L. Polson; Rick Martin

[57] ABSTRACT

A pivoting drill press mount is provided for enabling the user to drill at a desired angle into a workpiece. The mounting system has a column base, an upper column, and a pivot attaching the two columns to allow the upper column to be rotated to either side. The upper column is supported by an angle adjustment ram and a positive slide lock for safety. The assembly is bolted to a support surface. The upper column provides for interchangeable drill press heads by means of a connecting column.

20 Claims, 7 Drawing Sheets

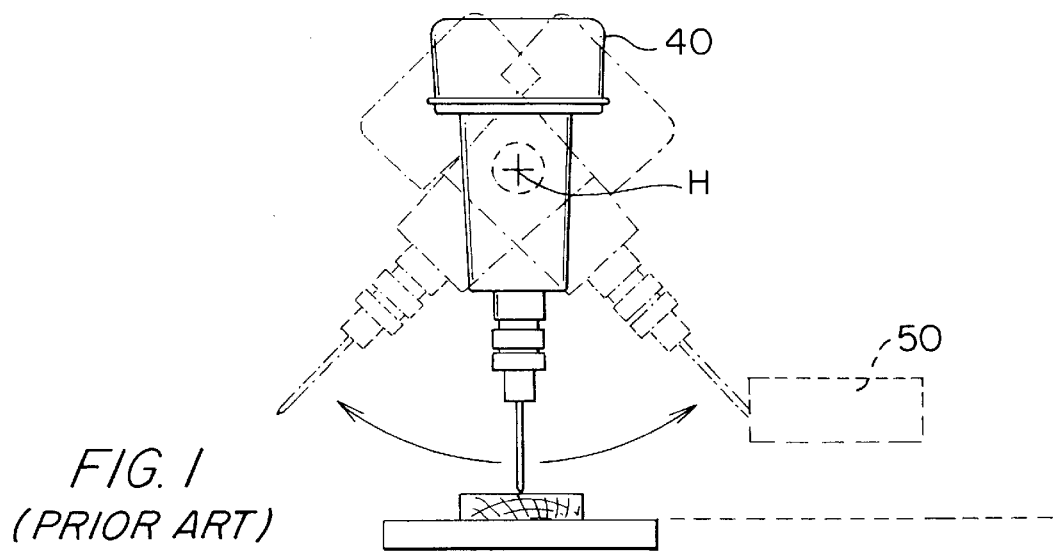
FIG. 1
(PRIOR ART)
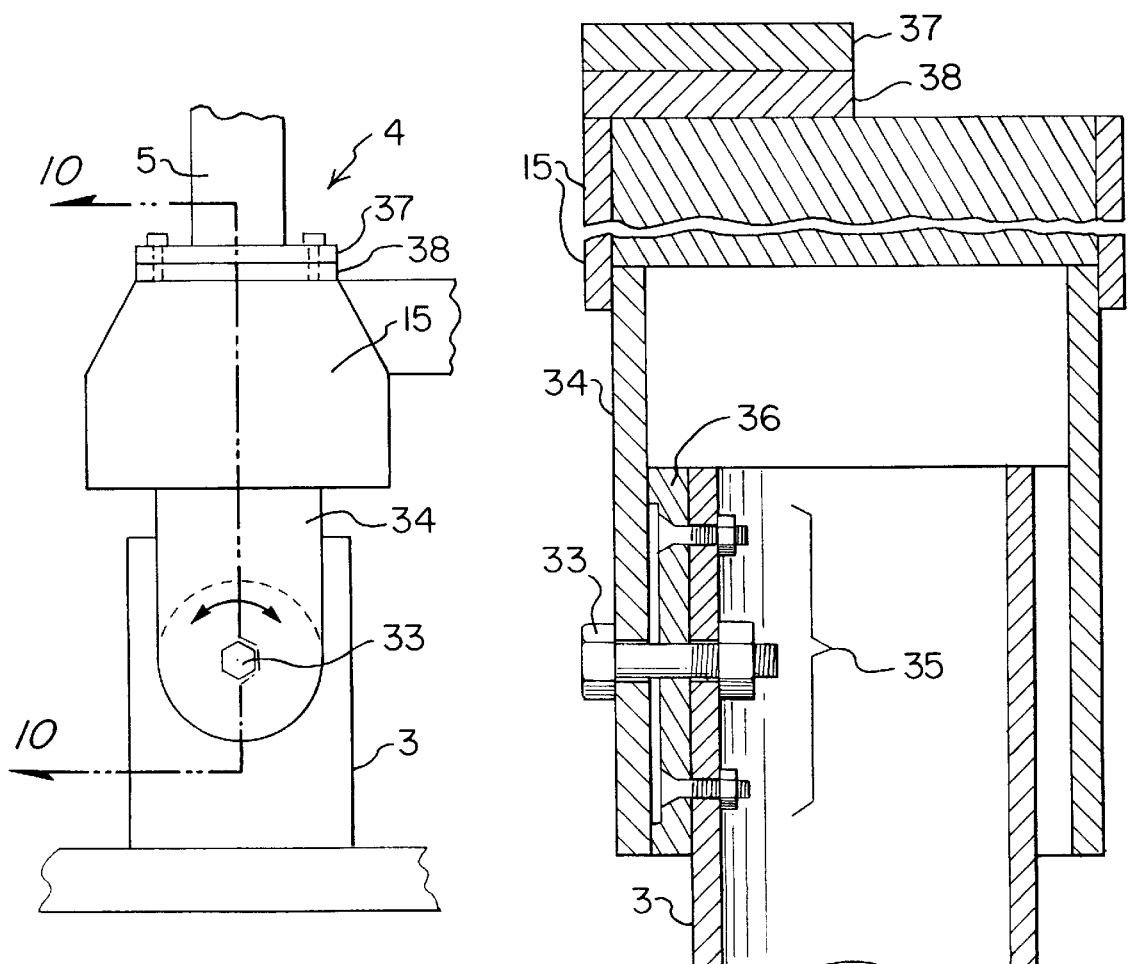
FIG. 9
FIG. 10

PIVOTING DRILL PRESS MOUNT

CROSS REFERENCE PATENTS

This application is a non-provisional application claiming the benefits of provisional application no. 60/042,529 filed on Apr. 1, 1997.

FIELD OF INVENTION

The present invention relates to a drilling apparatus. More particularly, this invention relates to a new and improved mounting system for a drill press unit that allows the user to pivot the column around a pivot point to allow for drilling at a desired angle without moving the workpiece.

BACKGROUND OF THE INVENTION

It is known in the art to mount a drill press on a pivoting mount to allow the drill press head to be pivoted. The pivoting allows the drill bit to drill at an angle into the workpiece. Drill presses manufactured by the American Machine Tool Company and Delta International Machinery Corporation pivot around the vertical axis of the support column and around the horizontal axis of the drill press head as shown in FIG. 1. In order to drill at an angle into a workpiece the user must move the workpiece to one side and up in order to line up with the drill bit.

U.S. Pat. No. 3,992,831 (1976) to Bukovitz et al. discloses a drill press that pivots from one side of the base of the support column. Therefore, the workpiece often does not have to be moved. However, the drill head does not pivot axially around the pivot axis, so that the drill bit remains a constant distance from the pivot axis. Bukovitz uses pneumatic rods to support the column. His device is complicated and does not provide for interchanging different drill press heads.

U.S. Pat. No. 3,102,440 (1961) to Miller discloses a drill press which rotates on a vertical axis around the support post. Again the user must move the workpiece in order to drill at an angle into the workpiece. If the user wants to drill a vertical hole and a hole at a specific angle to the vertical hole, then the user must first drill the vertical hole, then move the drill head, then move the workpiece over and up to use the drill bit. The user must figure out how far over to move the work piece by lowering the drill bit to see its path and then place the workpiece in the desired location.

The present invention solves this complex alignment problem by placing the pivoting mechanism within the column so that the drill head pivots around the workpiece. This means that the workpiece remains in one position while the drill press head is moved. The drill bit always remains the same distance from the pivot. If two holes at different angles are to be drilled in the workpiece, then this is much easier to accomplish than with previous systems. Once the first hole is drilled the workpiece only needs to be moved the desired distance to one side. The angle of the drill press head is then changed, and then the drilling is done.

The present invention uses a simple axle system to pivot the column and a simple support and adjustment system. The adjustment system consists of a rod with right handed threads, a rod with left handed threads, a turnbuckle threaded to receive the right handed rod in one end and the left handed rod in the other and a handle to adjust the angle. A positive slide lock is used on the opposite side of the column to add extra support and safety. A unique feature of the present invention is an interchangeable connecting column that allows any manufacture's drill press head to be mounted on the pivoting drill press support system.

SUMMARY OF THE INVENTION

The main aspect of the present invention is to provide a means to allow for angled drilling without having to move the workpiece, or adjust the workpiece support.

Another aspect of the present invention is to allow any drill press head to be mounted on the support column.

Another aspect of the invention is to allow the user to chose any angle within the range of motion of the pivot and positively lock the drill press in that position.

Other aspects of this invention will appear from the following description and appended claims, reference being made to the accompanying drawings forming a part of this specification wherein like reference characters designate corresponding parts in the several views.

The present invention relates to a system to mount a drill press head onto a column having a pivot. The column allows the drill press head to be rotated to provide for angled drilling.

All drill press heads are designed to mount onto a supporting base. The present invention includes a novel supporting base which has a pivot as part of the column. This allows the drill press head to be rotated around the axis of the pivot to provide for angled drilling.

The column base is securely attached to a support surface, such as the floor or a work table. Attached to the column base is a pivot axle having a pivot plate. Generally, the pivot axle is mounted in the center of the column base above the work table. The pivot plate is attached to the upper column, allowing the upper column to be rotated around the pivot axle to a desired angle.

An angle adjustment ram is attached to the upper column to provide a secure and safe means to move the column to the desired angle. A slide lock is attached to the other side of the upper column to provide further support and to allow the user to positively lock the column in place. The angle adjustment ram and the slide lock are both further attached to the supporting surface.

Removably attached to the top of the upper column is an interchangeable connecting column which is sized to allow the desired drill press head to be mounted onto the column.

The front of the upper column can have a protractor mounted to it centered above the pivot axle. An angle indicator is then placed on the pivot axle to show the angle at which the drill bit is located.

The column has a positive stop on the slide lock side at a maximum angle to prevent the column from putting too much strain on the support structure. This angle is approximately 50° from vertical. On the angle adjustment ram side the maximum angle is approximately 10°. This is caused by the construction of the angle adjustment ram. The two threaded rods run in to each other inside the turnbuckle at that angle.

BRIEF DESCRIPTION OF THE DRAWINGS

FIG. 1 (prior art) is a front perspective view of a drill press pivoting around the horizontal axis of the drill head.

FIG. 9 is a front plan view of an alternate pivot design.

FIG. 10 is a sectional cutaway view of the alternate pivot design taken along line 10—10 of FIG. 9.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Referring first to FIG. 1 the prior art pivoting drill press column (not shown) rotates around the horizontal axis H of the drill press head 40. The workpiece 50 has to be moved over and up to be in position to drill.

Figure 2:
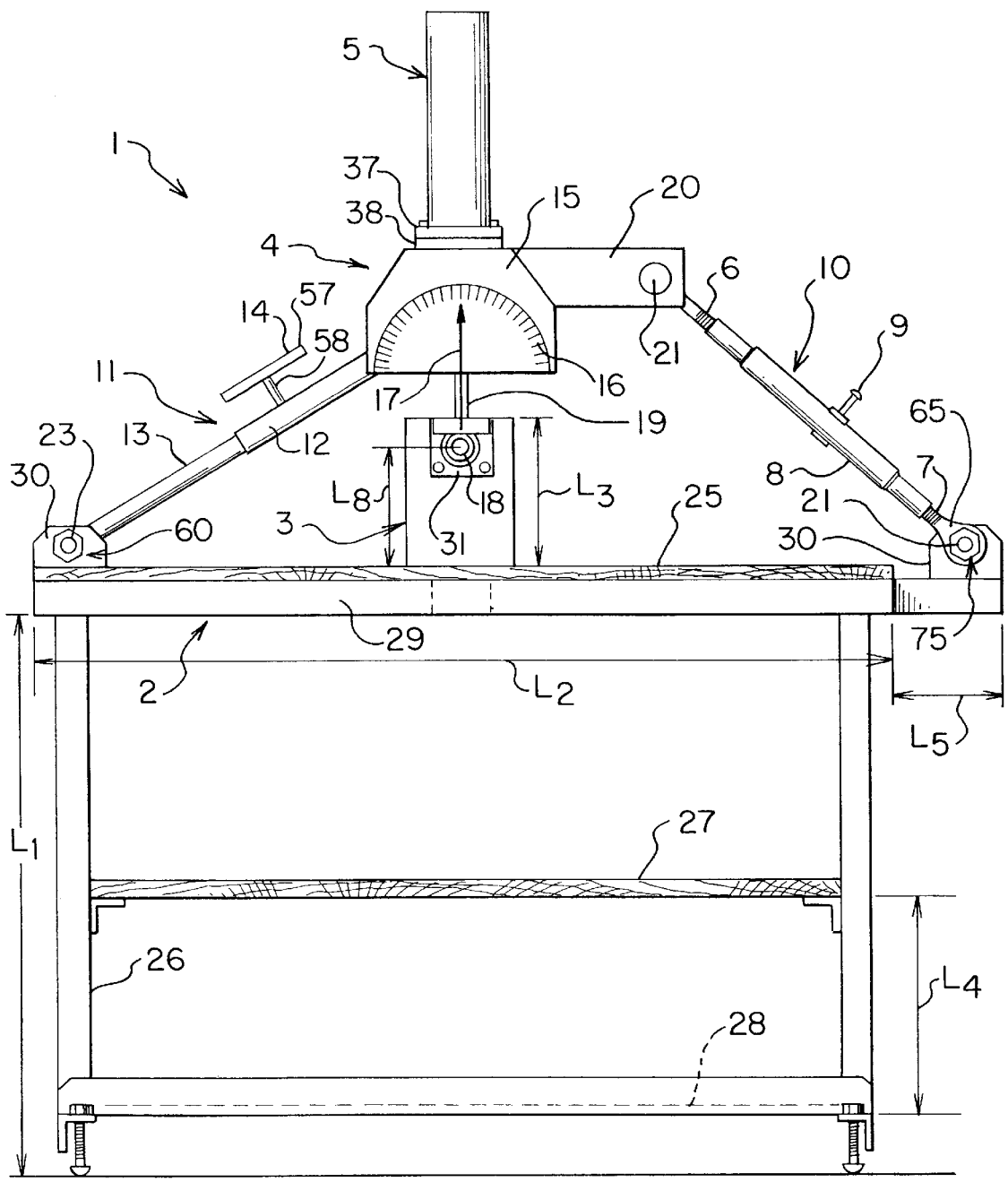
FIG. 2 is a front plan view of the preferred embodiment.
Figure 3:
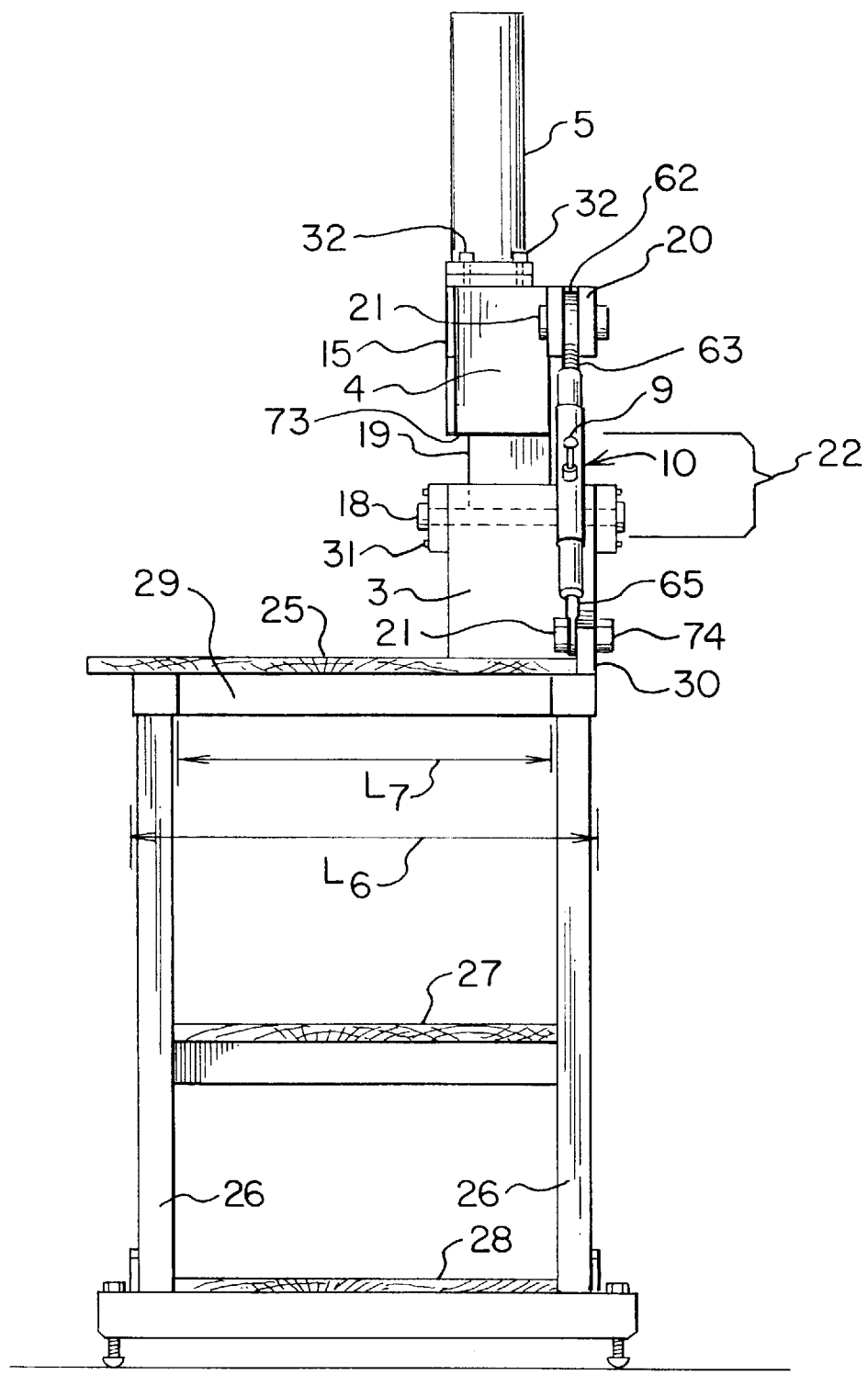
FIG. 3 is a right side plan view of the preferred embodiment.
Figure 4:
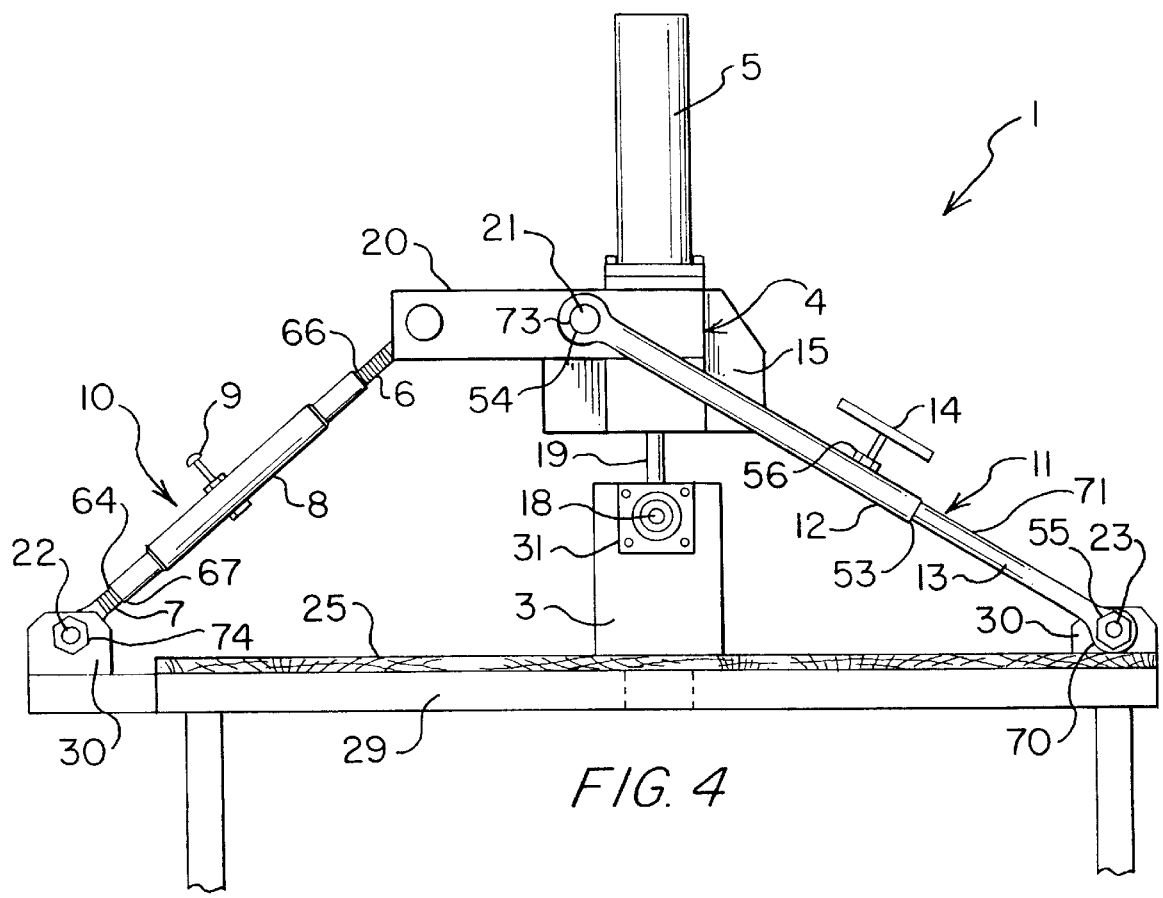
FIG. 4 is a back plan view of the preferred embodiment.
Figure 6:
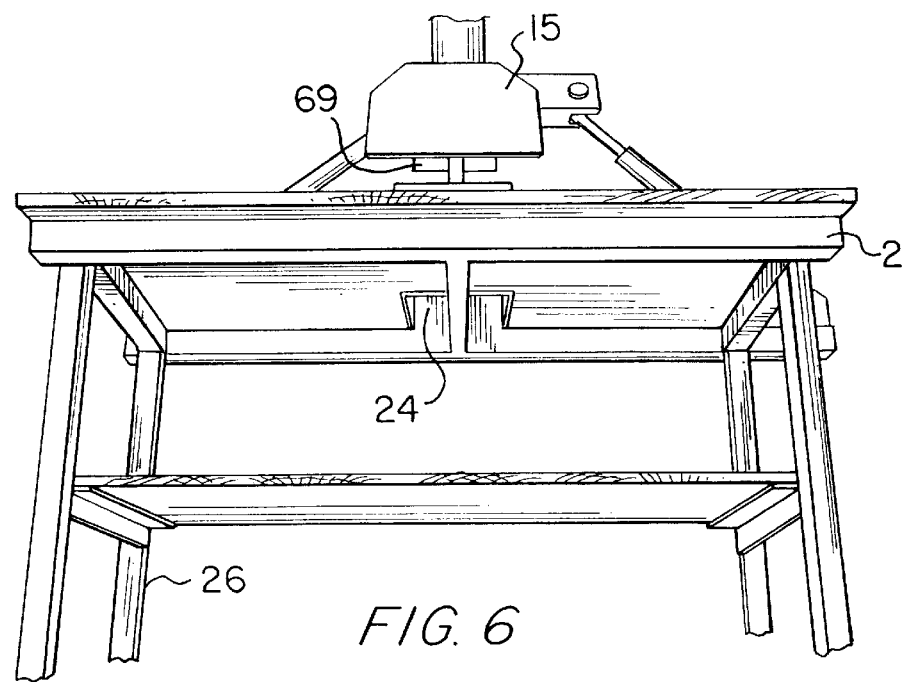
FIG. 6 is a front bottom perspective view of the preferred embodiment welded to a supporting table.

Referring next to FIGS. 2, 3, and 4 the pivoting drill press mount 1 is mounted atop a support table 2. The column base 3 has a height $1_3$. Column base 3 has mounting surfaces 24 suitable for attaching to a support surface. In the preferred embodiment the column base 3 is welded to the support table 2 as shown in FIG. 6. The height $1_3$ is 8 ¾" in the preferred embodiment.

The support table 2 has legs 26 having length l and frame 29. The table top 25 has a length $1_2$ and width $1_6$. The legs 26 are spaced $1_7$ apart on the sides of the support table 2. The preferred embodiment has a top shelf 27 and a bottom shelf 28 spaced distance $1_4$ apart. The table has an extension 76 having a length $1_5$.

In the preferred embodiments the lengths are as follows:

| | |
|---|---|
| $1_1$ 31" | $1_5$ 6" |
| $1_2$ 48" | $1_6$ 24" |
| $1_4$ 12" | $1_7$ 18" |

The upper column 4 has a bottom surface 69 which is pivotally connected to the column base 3 by a pivot mechanism 22 having a pivot axle 18 and a pivot plate 19. The pivot axle 18 rotates around pivot axis 23. The pivot axis is height $1_8$ above the support surface. In the preferred embodiment $1_8$ is 7". The angle of the connection is controlled by the angle adjustment ram 10 and the slide lock 11.

The angle adjustment ram 10 consists of an upper adjusting arm 6, a lower adjusting arm 7, an turnbuckle 8 and a handle 9. The upper adjusting arm 6 has threaded end 63 and a flattened end 62. The lower adjusting arm 7 has a threaded end 64 and a flatten end 65. The upper and the lower adjusting arm threaded ends, 63, 64 are threaded in opposite directions. Generally the upper adjusting arm threaded end 63 is right threaded and the lower adjusting arm threaded end 64 is left threaded.

The turnbuckle 8 is threaded on the inside of first end 66 to receive a right hand thread and on the inside of the second end 67 to receive a left hand thread. This allows both adjusting arms 6, 7 to be adjustably connected to the adjustment tube 8. The handle 9 allows the user to easily rotate the turnbuckle 8, causing the adjusting arms 6, 7 to either lengthen or shorten the angle adjustment ram 10.

The angle adjustment ram 10 is pivotally connected to the upper column 4 by the attachment arm 20 and bolt 21. The attachment arm 20 is connected at one end to one side of the upper column 4 near the top and has two holes 51, 52, one on each end, both large enough to receive a one inch bolt 21. The flattened end 62 of the upper adjustment arm 6 also has a hole 61 to receive a one inch bolt 21. The bolt 21 is fitted into the hole 51 and 61. Nut 74 is then threaded onto bolt 21, thus allowing the upper column 4 to pivot as the angle adjustment ram 10 is lengthened or shortened.

The angle adjustment ram 10 is pivotally connected to the support table 2. The flattened end 65 of the lower adjusting arm 7 having a hole 75 is placed at one of the bolt attachment points 30, having a hole 60, both sized to receive bolt 21. Bolt 21 is fitted through holes 60 and 75. Nut 74 is then threaded on to bolt 21.

The slide lock 11 serves to provide extra support and stability to the upper column 4 and to enable the user to positively lock the upper column 4 at a desired angle.

The slide lock 11 consists of the upper slide lock 12, the lower slide lock 13 and the position lock lever 14. The upper slide lock 12 is a hollow tube with an open end 53 and a flattened end 54 having a hole 73. The lower slide lock has a flattened end 70 having a hole 55 and sliding end 71. The sliding end 71 snugly fits inside the open end 53 of the upper slide lock 12, allowing the slide lock 11 to be extended or shortened by sliding the upper slide lock 12 over the lower slide lock 13.

The length of the slide lock 11 can be positively locked at any desired length by the position lock lever 14. The position lock lever 14 has a handle 57 and a threaded post 58. The threaded post 58 is threaded into a threaded hole 56 in the upper slide lock 12. When the position lock lever 14 is turned the threaded post 58 is pressed against the lower slide lock 13, thereby locking it in position. The angle of the column base 3 to the upper column 4 cannot be changed unless the position lock lever 14 is unlocked.

As shown in FIG. 4 the slide lock 11 is pivotally attached to the upper column 4 at hole 52 on the attachment arm 20. A bolt 21 is fitted through hole 52 and hole 73 in the upper slide lock 12. Nut 74 is then threaded onto bolt 21.

The slide lock 11 is also pivotally attached to the support table 2. The flattened end 70 of the lower slide lock 13 having a hole 55 is placed at the other bolt attachment point 30, having a hole 60, both sized to receive bolt 21. Bolt 21 is fitted through holes 60 and 73. Nut 74 is then threaded on to bolt 21.

To change the angle between the upper column 4 and the column base 3 the slide lock 11 is unlocked. Then the user rotates the turnbuckle 8 using the handle 9 to lengthen or shorten the angle adjustment ram 10. Once the desired angle is reached the slide lock 11 is locked in place using the position lock lever 14.

The angle of the upper column 4 can be determined using a protractor 16 mounted on a face plate 15 on the upper column 4. The protractor 16 is centered above the pivot axle 18. A angle indicator 17 is attached to the pivot axle 18 and indicates the angle of the upper column in a known manner.

Figure 8:
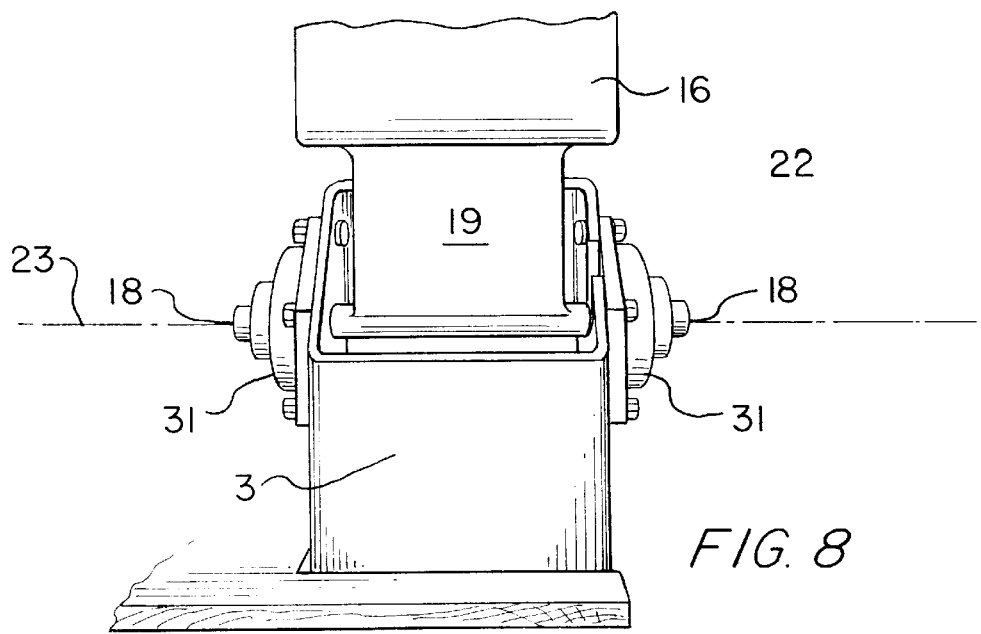
FIG. 8 is a side perspective view of the drill press mount of FIG. 2 pivoted to one side.

As shown in FIG. 8 the pivot mechanism 22 consists of a pivot axle 18 and a pivot plate 19. The column base 3 is hollow and has two pivot holes 42 on opposing sides near the top end 68 of the column base 3. Two pivot point face plates 31 with matching holes 32 are bolted to the column base 3 over the pivot holes 42 in the column base 3 with bolts 35. The pivot axle 18 extends through the column base 3 and both face plates 31 through holes 42 and 32. The pivot plate 19 extends from the pivot axle 18 up beyond the top end 68 of the column base 3. The pivot plate 19 is fixedly attached to the bottom surface 69 of the upper column 4.

Figure 5:
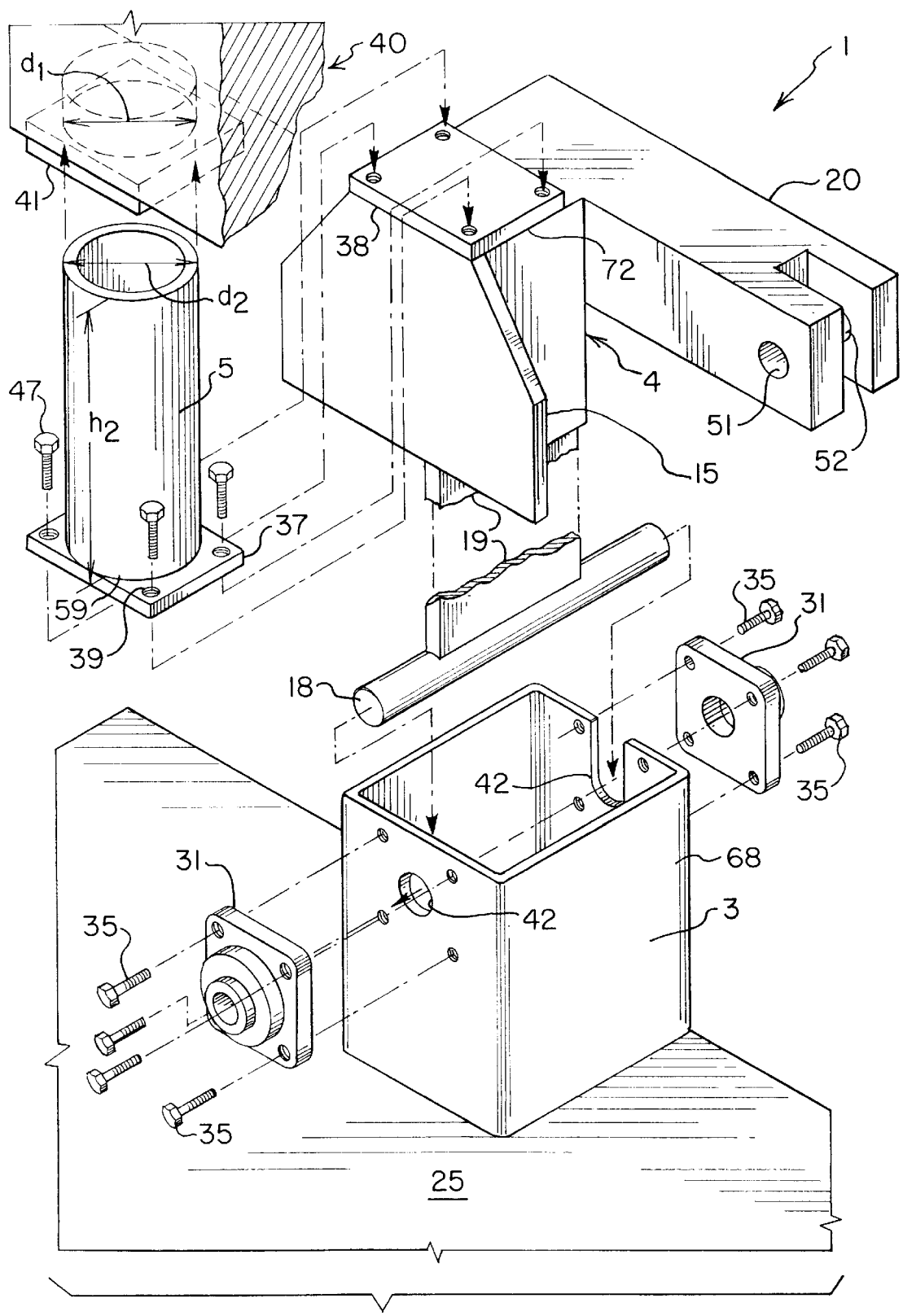
FIG. 5 is an exploded view of the pivot and connecting mechanism of the preferred embodiment.

As shown in FIG. 5, a connecting column 5 is removably attached to the top surface 72 of the upper column 4. The upper column 4 has a mounting plate 38 which has four holes 39. Attached to the bottom end of the connecting column 5 is a top plate 37 with complementary holes 39. The connecting column is mounted to the upper column by placing the top plate 37 on the mounting plate 38, then aligning the holes 39. Bolts 47 are then fitted through the holes 39 to attach the connecting column to the upper column 4. Nuts (not shown) are then threaded onto bolts 47.

As shown in FIG. 5 a drill press head 40 has a mounting hole 41 having an inside diameter $d_1$. The pivoting drill press mount 1 has an interchangeable connecting column 5, having an exterior diameter of $d_2$ and a height $h_2$. To mount the drill press head 40 on the pivoting drill press mount 1 the user slides the mounting hole 41 down over the connecting column 5.

$d_2$ must be slightly smaller than $d_1$ and to allow the mounting hole 41 to slide over the connecting column 5. The height $h_2$ and diameter $d_2$ of the connecting column 5 is determined by the dimensions of the drill press the user desires to mount on the invention. The drill press head 40 is secured by set screws 48 in the side of the post 41, shown in FIGS. 11 and 12, which press into the connecting column 5.

Figure 7:
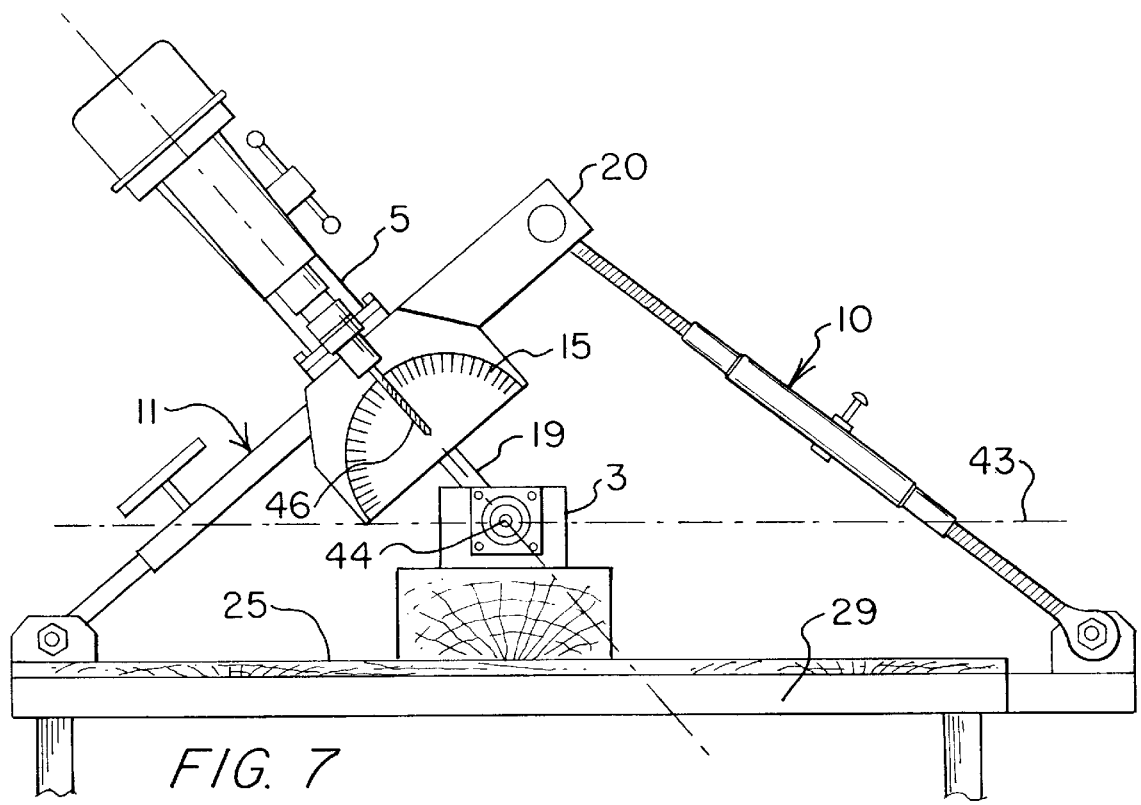
FIG. 7 is a front plan view of the preferred embodiment with a drill press head mounted and the column pivoted to an angle of 49°. The dotted lines show how the line of the drill bit always intersects the pivot point.
Figure 12:
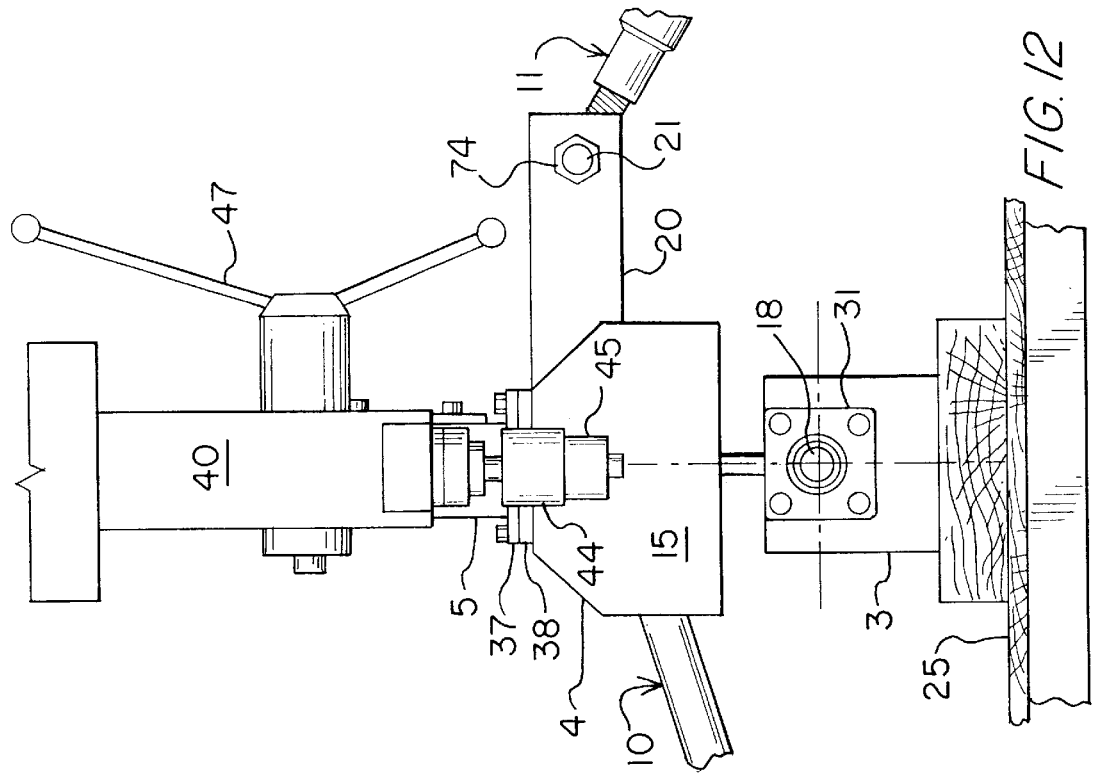
FIG. 12 is a front plan view of the preferred embodiment with a drill head mounted on it.
Figure 11:
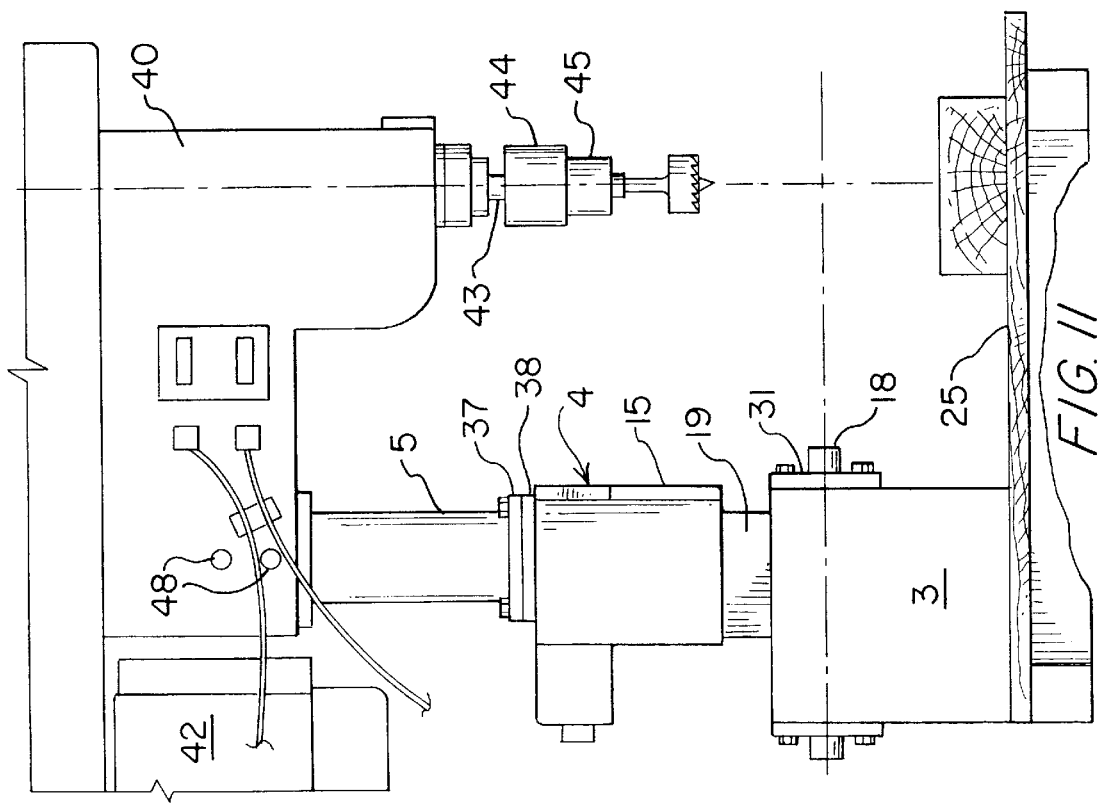
FIG. 11 is a side plan view of the preferred embodiment with a drill head mounted on it.

FIGS. 7, 11 and 12 show the preferred embodiment with a drill press head 40 mounted on it. FIG. 7 shows the drill press head 40 pivoted to an angle of 49°. As shown by the dotted lines the drill bit 46 and the horizontal line 43 of the pivot 22 always intersect at the same location 44, making drilling much simpler.

The drill bit 46 is lined up with the pivot axis 23 of the pivot mechanism 22 as shown in FIG. 7. This means that the drill bit 46 moves axially around the pivot axis 23 and always remains the same distance dx from the pivot axis 23.

In the preferred embodiment the pivot mechanism 22 has a positive stop at about 50° on the slide lock side and approximately 10° on the angle adjustment ram side. On the slide lock side the pivot plate 19 connects with the side of the column base 4 as shown in FIG. 6. The two adjusting arms of the angle adjustment ram run into each other inside the turnbuckle on that side.

A second type of pivot mechanism 45 is seen is FIG. 9. In this embodiment a pivot plate 34 has a vertically centered hole through which pivot bolt 33 is placed through. Behind the pivot plate 34 is a movement surface 36 with thrust bushing which is attached to one side of the column base with bolts 35. As shown in FIG. 10, the pivot plate 34 slides against the movement surface 36 with thrust bushing as it rotates around the pivot bolt 33. The top of pivot plate 34 is attached to the upper column 4. This type of pivot design does not have a positive stop.

Although the present invention has been described with reference to preferred embodiments, numerous modifications and variations can be made and still the result will come within the scope of the invention. No limitation with respect to the specific embodiments disclosed herein is intended or should be inferred.

KEY

| | |
|---|---|
| 1. Pivoting Drill Press Mount | 25. Table top |
| 2. Support table | 26. Legs |
| 3. Column base | 27. Top shelf |
| 4. Upper column | 28. Bottom shelf |
| 5. Connecting column | 29. Frame |
| 6. Upper adjusting arm | 30. Bolt attachment point |
| 7. Lower adjusting arm | 31. Pivot point plate |
| 8. Turnbuckle | 32. hole |
| 9. Handle | 33. Pivot point bolt |
| 10. Angle adjustment ram | 34. Alternate pivot plate |
| 11. Slide lock | 35. Bolt |
| 12. Upper slide lock | 36. Movement point |
| 13. Lower slide lock | 37. Top plate |
| 14. Position lock lever | 38. Mounting plate |
| 15. Face plate | 39. Holes |
| 16. Protractor | 40. Drill head |
| 17. Angle indicator | 41. Mounting hole |
| 18. Pivot axle | 42. Pivot hole |
| 19. Pivot plate | 43. Horizontal line |
| 20. Attachment arm | 44. Intersect point |
| 21. Bolt | 45. Alternate pivot |
| 22. Pivot mechanism | 46. Drill bit |
| 23. Pivot axis | 47. Bolts |
| 24. Mounting surface | 48. Set screws |
| 50. Workpiece | 75. Hole |
| 51. Hole | 76. Extension |
| 52. Hole | |
| 53. Open end | |
| 54. Flattened end | |
| 55. Hole | |
| 56. Threaded hole | |
| 57. Handle | |
| 58. Threaded Post | |
| 59. Bottom end of connecting column | |
| 60. Hole | |
| 61. Hole | |
| 62. Flattened end | |
| 63. Threaded end | |
| 64. Threaded end | |
| 65. Flattened end | |
| 66. Right hand threaded end | |
| 67. Left hand threaded end | |
| 68. Top end of column base | |
| 69. Bottom surface of upper column | |
| 70. Flattened end | |
| 71. Sliding end | |
| 72. Top surface | |
| 73. Hole | |
| 74. Nut | |

I claim:

1. A pivoting drill press mount for mounting atop a support surface, said pivoting drill press mount comprising:
    a column base having a top end and a bottom end;
    said column base attached to a support surface;
    a pivot mounted within said top end of said column base;
    a pivot shaft extending from said pivot and beyond the top end of said column base;
    an upper column having a top end and a bottom end and being attached at the bottom end to said pivot shaft, thereby allowing the upper column to be pivoted to a desired angle with relation to the column base; and
    a lock to secure the upper column at a desired angle.

2. The pivoting drill press mount of claim 1, wherein said lock comprises;
    an expandable angle adjustment ram extending from the upper column to the support surface, said angle adjustment ram being pivotally mounted to both the upper column and to the support surface;
    a slide lock extending from the upper column to the support surface on the opposing side from said angle adjustment ram, said slide lock being pivotally mounted to both the upper column and to the support surface.

3. The pivoting drill press mount of claim 2 further comprising;

a connecting column having a top and a bottom end and being removably attached at the bottom end to said top end of the upper column, thereby allowing the user to mount a drill press head on said column pivot drill press mount.

4. The pivoting drill press mount of claim 3 further comprising;

a face plate mounted on the upper column directly above the pivot;

a protractor mounted on the face plate and centered above the pivot; and an angle indicator mounted vertically on the center of the pivot on the same side as the protractor, functioning to indicate the angle of the upper column from the column base.

5. The pivoting drill press mount of claim 4, wherein the expandable angle adjustment ram further comprises:

an upper adjusting arm having a threaded end and a flattened end having a hole;

a lower adjusting arm having a threaded end and a flattened end having a hole;

a hollow adjustment tube having an inside and an outside;

said upper adjusting arm threaded end and said lower adjusting arm threaded end being threaded in opposite directions;

said inside of said hollow adjustment tube being threaded to receive the threaded ends of said adjusting arms;

a turnbuckle being mounted to the outside of said hollow adjustment tube, functioning to provide a handle.

6. The pivoting drill press mount of claim 5, wherein said slide lock further comprises:

a upper slide lock having a hollow end, a flattened end having a threaded hole extending through a side wall of the hollow end;

a lower slide lock having a end adapted to fit inside of said upper slide lock and a flattened end having a hole;

a position lock lever having a handle and a threaded post extending from the handle;

said upper slide lock being slid down over said lower slide lock to form said slide lock;

said threaded post of said position lock lever being threaded into said threaded hole in said upper slide lock, functioning to lock said slide lock at a desired length.

7. The pivoting drill press mount of claim 6 further comprising;

a drill press head mounted on said connecting column.

8. A pivoting drill press mount for mounting atop a support surface, said pivoting drill press mount comprising:

a column base having a top end, a bottom end and a first movement surface;

said column base attached to a support surface;

a pivot bolt extending through said top end of said column base;

a pivot shaft having a second movement surface and a front surface;

said pivot shaft movably attached to said pivot bolt with said movement surface being frictionally engaged with said movement surface of said column base;

an upper column having a top and a bottom end and being attached at the bottom end to said pivot shaft, thereby allowing the upper column to be pivoted to a desired angle with relation to the column base; and a lock securing the upper column at a desired angle.

9. The pivoting drill press mount of claim 8, wherein said first movement surface comprises a thrust bushing.

10. The pivoting drill press mount of claim 9, wherein said lock comprises;

an expandable angle adjustment ram extending from the upper column to the support surface, said angle adjustment ram being pivotally mounted to both the upper column and to the support surface;

a slide lock extending from the upper column to the support surface on the opposing side from said angle adjustment ram, said slide lock being pivotally mounted to both the upper column and to the support surface.

11. The pivoting drill press mount of claim 10 further comprising;

a connecting column having a top and a bottom end and being removably attached at the bottom end to said top end of the upper column, thereby allowing the user to mount a drill press head on said column pivot drill press mount.

12. The pivoting drill press mount of claim 11 further comprising;

a drill press head mounted on said connecting column.

13. The pivoting drill press mount of claim 11 further comprising;

a face plate mounted on the upper column directly above the pivot;

a protractor mounted on the face plate and centered above the pivot; and an angle indicator mounted vertically on the center of the pivot on the same side as the protractor, functioning to indicate the angle of the upper column from the column base.

14. The pivoting drill press mount of claim 11, wherein the expandable angle adjustment ram further comprises:

an upper adjusting arm having a threaded end and a flattened end having a hole;

a lower adjusting arm having a threaded end and a flattened end having a hole;

a hollow adjustment tube having an inside and an outside;

said upper adjusting arm threaded end and said lower adjusting arm threaded end being threaded in opposite directions;

said inside of said hollow adjustment tube being threaded to receive the threaded ends of said adjusting arms;

a turnbuckle being mounted to the outside of said hollow adjustment tube, functioning to provide a handle.

15. The pivoting drill press mount of claim 11, wherein said slide lock further comprises:

a upper slide lock having a hollow end, a flattened end having a threaded hole extending through a side wall of the hollow end;

a lower slide lock having a end adapted to fit inside of said upper slide lock and a flattened end having a hole;

a position lock lever having a handle and a threaded post extending from the handle;

said upper slide lock being slid down over said lower slide lock to form said slide lock;

said threaded post of said position lock lever being threaded into said threaded hole in said upper slide lock, functioning to lock said slide lock at a desired length.

16. A method for working on a workpiece at multiple angles with a power tool without moving the workpiece comprising:
- forming a two piece mounting column containing a centrally mounted pivot between the upper and lower pieces;
- mounting a power tool to an upper member of said mounting column such that a contact point of the power tool with the workpiece is vertically aligned with the pivot;
- setting the mounting column at a first angle;
- using the power tool on the workpiece at the first angle;
- setting the mounting column at a second angle;
- using the power tool on the workpiece at the second angle.

17. The method of working on a workpiece at multiple angles with a power tool without moving the workpiece of claim 16, further comprising providing the power tool as a drill press.

18. The method of working on a workpiece at multiple angles with a power tool without moving the workpiece of claim 17, further comprising attaching the column to a support surface.

19. The method of working on a workpiece at multiple angles with a power tool without moving the workpiece of claim 18, further comprising setting the mounting column at the desired angle with an angle adjustment ram.

20. The method of working on a workpiece at multiple angles with a power tool without moving the workpiece of claim 19, further comprising locking the mounting column at the desired angle with a slide lock.

* * * * *